July 8, 1958

G. F. JUDE ET AL 2,842,324

AIRCRAFT HAVING RADIO BEAM ACTUATED
AUTOMATIC PILOT MECHANISM

Filed March 21, 1955

INVENTORS
GEORGE F. JUDE
PERCY HALPERT
BY Arthur H. Serrell
ATTORNEY

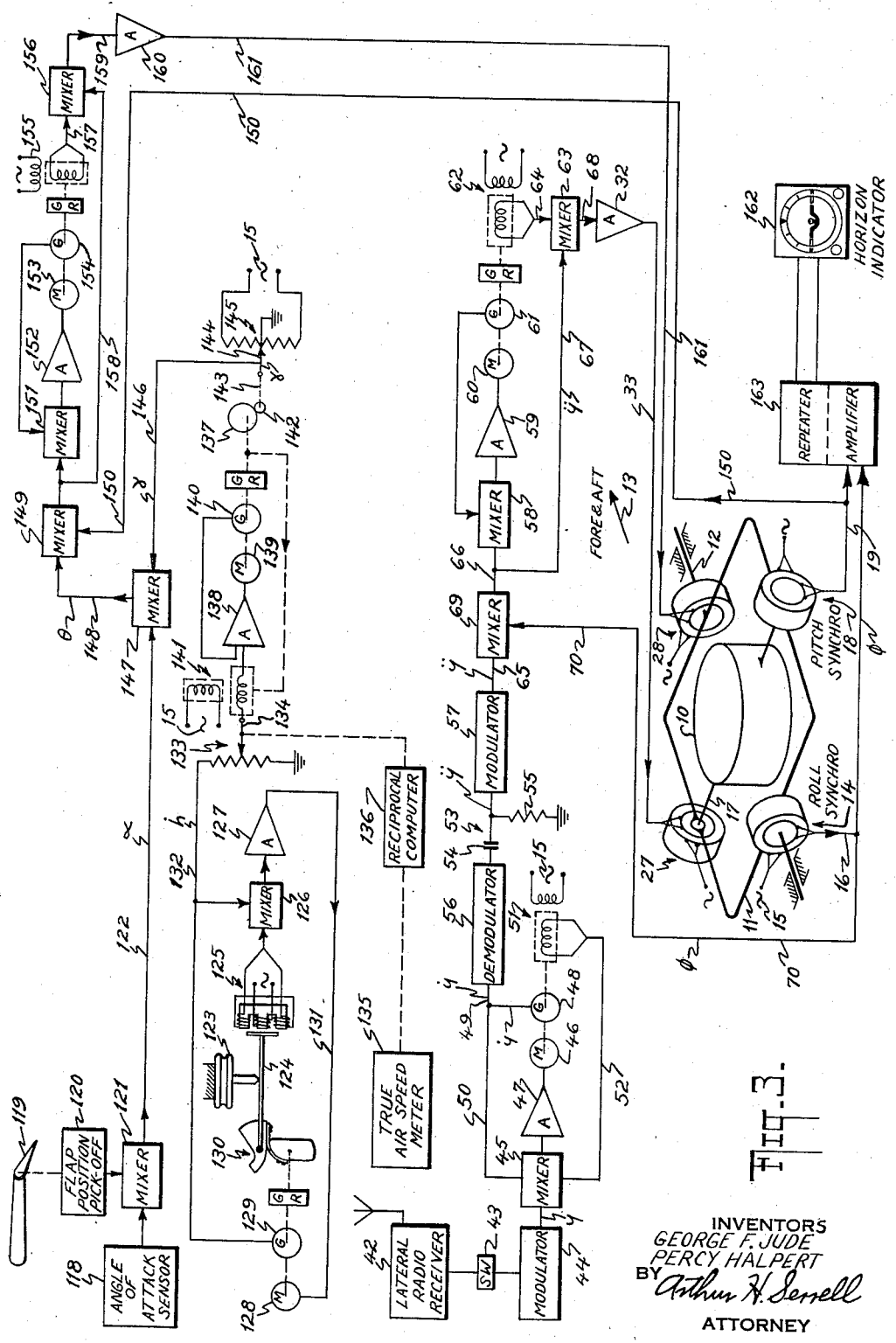

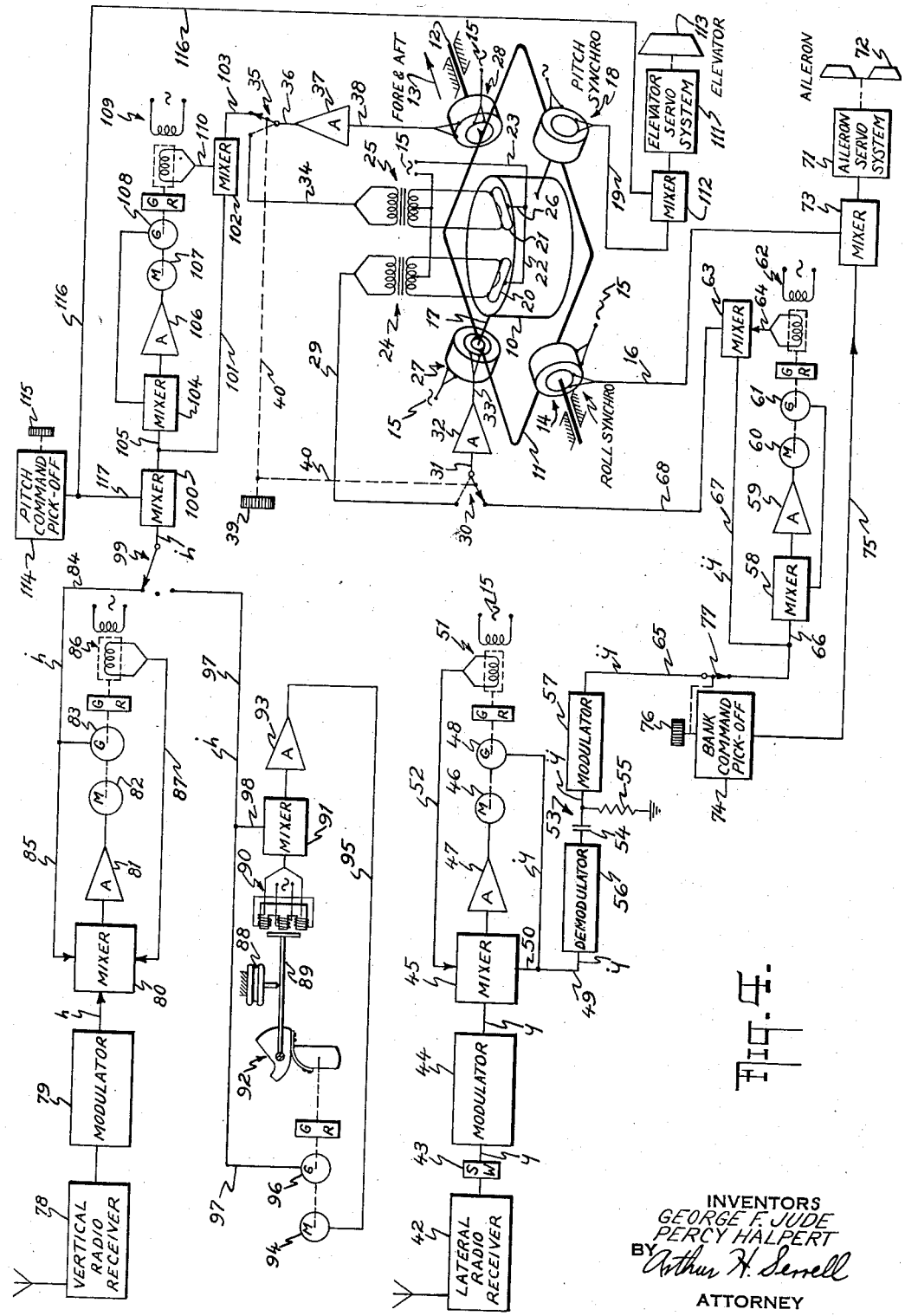

United States Patent Office 2,842,324
Patented July 8, 1958

2,842,324

AIRCRAFT HAVING RADIO BEAM ACTUATED AUTOMATIC PILOT MECHANISM

George F. Jude, Fresh Meadows, and Percy Halpert, Hempstead, N. Y., assignors to Sperry Rand Corporation, a corporation of Delaware Application March 21, 1955, Serial No. 495,432

22 Claims. (Cl. 244—77)

This invention relates to an improved gyroscopic vertical reference instrument for dirigible craft. The device may perform the function of an artificial horizon in manually piloted craft or serve as the vertical reference component in an automatic pilot where the craft is navigated automatically.

Instruments of this general character have heretofore been monitored to define the vertical by an erection or slaving control from a basic vertical reference such as a gravity responsive element that may be provided by a pendulum, by liquid level switches or one or more moving weights. The average position of such long period basic references defines a relatively accurate vertical that is utilized in the described combination to control the short period gyro. The gyro in this arrangement functions as an integrator for the data provided by the basic gravity reference that is slowly erected or monitored to define a vertical that coincides with the average position of the long period reference. The accuracy of the described type of basic reference is disturbed by the effect of acceleration thereon either in straight flight or maneuvers of the craft in which the instrument is employed. In automatic pilot usage with pendulously erected gyro verticals, it is customary to disable the monitoring controls exerted by the basic reference when the craft is to be maneuvered. In artificial horizons, turn error is prevented from being reflected in the instrument indication by special constructional provisions taking the error into account as by disabling the part of the basic reference that is affected by centrifugal acceleration.

The primary object of the present invention is to provide a reference instrument of the character described that is monitored or erected by means of a basic long term reference that is unaffected by craft acceleration and thusly avoid the noted complications and refinements heretofore required.

In accordance with the present invention, the basic reference controls provided for the gyro vertical may be obtained from a radio receiver providing a signal in accordance with departure of the craft from a directional radio guidance beam such as the localizer or glide path beam of an instrument landing system, or an omnirange or Doppler radar directional beam. The provided reference may also take the form of an altimeter per se in the automatic pilot form of the invention illustrated. An angle of attack sensor, an airspeed meter and altimeter provide a third composite reference for the artificial horizon form of gyro vertical shown in the drawing that together provide a signal in accordance with the angle of pitch of the craft.

With respect to the roll axis of the craft, the invention makes use of the principle that lateral or cross course accelerations of the craft are proportional to roll attitude deviations from a wing's level configuration. Consequently, an error in the reference provided by the gyro vertical can be corrected by a monitoring signal proportional to the acceleration of the craft in a cross course lateral direction. The basic reference in this instance may be a suitable radio guidance beam of the character hereinbefore noted.

In the automatic pilot form of the invention, a similar arrangement is employed to correct for error of the gyro vertical relative to its pitch axis. In this instance, the error in the gyroscopic reference is corrected by a monitoring signal proportional to the velocity of the craft in a cross course vertical direction. The basic reference in this instance may be the beam of a radio glide path receiver or an altimeter.

In the artificial horizon form of the invention, the monitoring signal for correcting pitch error in the gyro vertical may be derived by a comparison of the output of the pitch pick-off of the gyroscopic reference and the sum of reference signals representing both the actual angle of attack of the craft and the flight path angle. Any difference between the noted signals is utilized as a monitoring input to the gyro vertical.

The particular references herein provided for monitoring or erecting the improved gyro vertical are all insensitive to craft accelerations and consequently are not subject to errors due to this cause. Equivalent long term references that are unaffected by gravity and provide a measure of cross course lateral acceleration, cross course vertical velocity or pitch angle may be employed to monitor the gyro vertical within the intended scope of the present inventive concepts.

Other objects, features and structural details of the invention will become clearly apparent from the following description of the invention when considered in relation to the accompanying drawings where, Fig. 1 is a graphic view of a dirigible craft depicting the angle of attack $\alpha$ and flight path angle $\gamma$ thereof, both of such angles being factors considered in the description of the herein illustrated artificial horizon form of the present invention concepts;

Fig. 3 is a schematic view and circuit diagram of an artificial horizon type of improved gyro vertical instrument embodying the present inventive concepts; and Fig. 4 is a view similar to Fig. 3 in which the improved instrument provides the vertical reference component of an aircraft automatic pilot.

Figure 1:
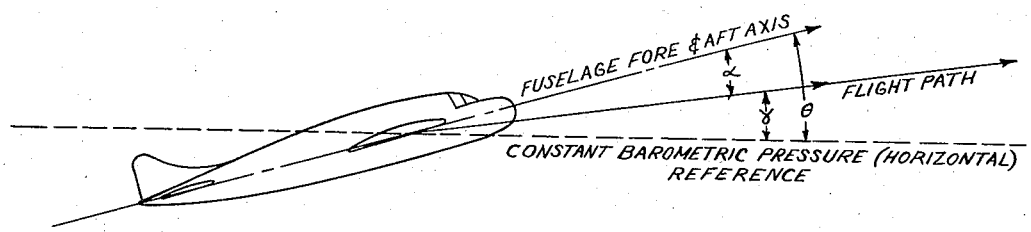

Referring particularly to Figs. 3 and 4, the improved gyro vertical reference instrument shown includes conventional rotor case 10 and gimbal ring 11 elements arranged in the usual manner in a suitable instrument housing that is fixed to the dirigible craft. Rotor case element 10 is a closed frame that supports a gyroscopic rotor therein to spin about a normally vertical axis which is the reference axis defined by the gyroscopic instrument. Any suitable driving means or motor may be provided within the frame to spin the rotor in a known manner when the instrument is operatively conditioned. The ring 11 universally supports the rotor case 10 within the housing or relative to the craft with freedom about a normally horizontal major axis 12 located in a direction fore and aft of the craft as depicted by the arrow 13. This axis is coincident with or parallel to the longitudinal or roll axis of the craft. Tilt of the craft from a level condition about its roll axis as determined by the gyro vertical reference instrument is measured by the output of a roll synchro or suitable selsyn type pick-off 14 whose stator is fixed to the instrument housing or craft and whose rotor is fixed to the gimbal ring 11. As shown, the stator windings of the pick-off 14 are energized from a suitable source of alternating current electrical energy indicated at 15. The output signal of the pick-off 14 is provided by the rotor windings thereof fed by way of lead 16. The amplitude and phase of the pick-off 14 signal is dependent on the magnitude and sense of the relative displacement between the craft and ring 11 about the axis 12. When the wings of the craft are level and the gyro vertical is properly erected with its rotor spin axis vertical, there is a null output from the roll synchro or pick-off 14.

The minor axis 17 of the gyro vertical instrument which is both normally horizontal and perpendicular to the axis 12 is accordingly located in a direction athwartship of the craft in which the instrument is mounted. As shown, the rotor case element 10 of the gyro vertical is mounted on the ring 11 with freedom about axis 17 which is coincident with or parallel to the pitch axis of the craft. Displacement of the craft from a level condition about its pitch axis with respect to the reference determined by the gyro vertical is measured by means of a suitable pitch synchro or selsyn pick-off 18. The stator of the pick-off 18 is fixedly connected to the gimbal ring 11 and energized from alternating current source 15. The rotor of the pick-off 18 is fixedly connected to the rotor case 10 being located on one of the trunnion pieces extending therefrom. The output signal of the pick-off 18 is carried by lead 19. The amplitude and phase of the pick-off 18 signal is dependent on the magnitude and sense of the relative displacement between the ring 11 and rotor case 10 from the reference determined by the instrument in relation to axis 17. In this instance, movement of the craft about its pitch axis results in corresponding motion of the stator of the pick-off 18 effected through the gimbal ring 11. With the gyro vertical properly erected and the craft at the pitch reference position determined by the gyro vertical, there is a null output from the pitch synchro or pick-off 18.

The reference instrument illustrated in the drawings may be initially erected in a conventional manner by a gravity controlled monitor as heretofore considered which includes, as shown only in Fig. 4, a pendulous element in the form of two liquid level switches 20 and 21. Switch 20 energized from source 15 is fixedly mounted on the rotor case element 10 in a position to detect tilt about the axis 12 of the instrument. Switch 21 energized from the same source is likewise mounted on the element 10 in a position to detect tilt about axis 17. The input to switch 20 is carried by leads 22 and 23 from the source 15. The output of the roll tilt switch 20 is connected across the primary winding of center-tapped transformer 24, the tapped lead thereto being connected to source 15. A similarly connected transformer 25 is provided to receive the output signal of the pitch liquid level switch 21. The input to the switch 21 is obtained from lead 26 connected to the lead 23 to the source 15. The described electrical bridge circuits including the switches 20, 21 and transformers 24 and 25 provide outputs whose amplitude and phase depend on the magnitude and sense of tilt of the respective switches from a level condition. In this connection, the monitoring or erecting devices provided include an erecting motor 27 for exerting a torque about the axis 17 of the instrument and an erecting motor 28 for exerting a torque about the axis 12 of the instrument. The respective torque exerting devices 27 and 28 may be conventional two phase alternating current induction motors with a continuously excited winding energized from source 15 and a control field winding energized in accordance with the output of the liquid level switches 20 and 21. As shown, liquid level 20 is connected to operate torque motor 27 by way of transformer 24, lead 29 connected to the secondary of transformer 24, a single pole, double throw switch 30 with the blade thereof shown in the dotted line position in Fig. 4, lead 31, amplifier 32 and lead 33 to the control field winding of the motor 27. With an output from the liquid level switch 20, the torque motor 27 is energized to effect precession of the rotor case 10 about roll axis 12 in such a direction as to restore the switch to a level condition. A similar monitoring or erecting control is effective about the pitch axis where the liquid level switch 21 is connected to operate torque motor 28 by way of transformer 25, the lead connection 34 to the secondary of the transformer 25, a single pole, double throw switch 35 with the blade thereof shown in the dotted line position in Fig. 4, lead 36, amplifier 37 and lead 38 to the control field winding of the motor 28. A single knob 39 with mechanical connections 40 to the blades of the respective switches 30 and 35 is settable in two selective positions, in one of which the gyro vertical is monitored or erected by a conventional pendulous controller as described. When so conditioned, the blades of the respective switches 30 and 35 assume the dotted line position shown in Fig. 4 where liquid level 20 is connected to torque motor 27 and liquid level 21 is connected to torque motor 28. With the blades of the switches 30 and 35 in the full line positions shown in Fig. 4, the connections between the respective liquid levels 20 and 21 and torque motors 27 and 28 are broken and the conventional erection control is disabled. In operation of the instrument, this control may be restored if desired by manipulation of the setting of the knob 39. The described type of changeover and erection arrangement is equally useful in the artificial horizon form of gyro vertical instrument shown in Fig. 3, the same being omitted therefrom to avoid unnecessary duplication.

In accordance with the present inventive concepts as depicted in both of the illustrated forms of the invention, the improved gyro vertical is erected or monitored about its roll or fore and aft located axis 12 by means of a controlling signal for torque motor 27 that is proportional to or in accordance with the cross course acceleration of the craft in a lateral direction. This signal may be derived from a long period reference that is unaffected by gravitational acceleration and provides a measure of the lateral displacement of the craft from a radio guidance beam such as represented at 41 in Fig. 2 The beam 41 defines the course null for the craft and may be of any known directional radio guidance type such as heretofore noted. The corresponding radio receiver 42 on the craft provides a signal output that is in accordance with the craft's lateral displacement from the beam 41 as represented by factor "$y$" in Fig. 2. A reversing switch 43 is required to insure proper sensing for both directions of flight of the craft on the beam where the position of the craft with respect to the radio course null 41 is obtained from a conventional radio receiver as employed in instrument landing systems (ILS). In accordance with the invention, while the craft is pursuing the radio guidance course in the properly yaw trimmed condition, the second derivative of any signal "$y$" from the radio receiver 42 is proportional to the roll error of the gyro vertical and such a correction is utilized to operate the pitch torque motor 27 to properly erect or monitor the improved instrument.

As shown in Figs. 3 and 4, the signal output "$y$" from the radio receiver 42 is fed by way of reversing switch 43 to a suitable modulator 44. The combination includes a means responsive to the signal of the radio receiver 42 providing an output in accordance with the acceleration of the craft in a cross course lateral direction. The components defining this means include a velocity signal generating follow-up with a mixer 45 receiving the operating input signal "$y$" from the modulator 44. The output of mixer 45, as shown, is utilized to drive a motor-generator set whose motor 46 is operated by the output of amplifier 47 fed by mixer 45. The generator 48 driven by the motor 46 has an output lead 49 carrying the first derivative "$\dot{y}$" of the displacement signal "$y$." Lead 50 also carries the output of the generator 48 to the mixer 45 as a feedback control for the motor 47. As shown, the follow-up also includes a second feedback control from a further signal generator 51 whose rotor is connected to motor 46 through suitable reduction gearing. Lead 52 connects the rotor of generator 51 to the mixer 45. Other known equivalents for differentiating the displacement signal "y" may be utilized in lieu of the described follow-up arrangement.

The component providing for the second differentiation of the "y" signal is provided by a rate network 53 consisting of condenser 54 and grounded resistor 55. The input to the rate network 53 is obtained from a suitable demodulator 56 whose input is provided by the "ẏ" signal carried by lead 49. The second derivative "ÿ" signal from the rate network 53 is remodulated in a suitable modulator 57 for use by the torque motor 27 represented in both Figs. 3 and 4.

The control input signals to the improved gyro vertical combination may be integrated to eliminate static errors due to the earth's rotation and unbalance in the gyro instrument. The integrator of the combination shown in Figs. 3 and 4 employed for this purpose consists of a follow-up arrangement including mixer 58, amplifier 59, motor 60, generator 61 which provides a feedback input to mixer 58 and is driven by motor 60, and generator 62 driven by motor 60 through suitable gear reduction whose rotor output is fed to the mixer 63 by way of lead 64. The integrator of the combination receives an input from the acceleration output providing means of the combination by way of leads 65 and 66. The acceleration signal "ÿ" is also fed the mixer 63 directly by way of lead 67 so that the torque motor 27 is operated in accordance with the outputs of the acceleration signal producing means and the integrator. The noted signals combined by mixer 63 are fed the torque motor 27 by way of lead 68, amplifier 32 and lead 33.

In the artificial horizon form of the invention shown in Fig. 3, the need of a controlling input to monitor the gyro vertical is determined by comparing the signal "ÿ" and the roll tilt detecting signal $\phi$ of the roll synchro or pick-off 14. This comparison is made at a mixer 69 connected to pick-off 14 by lead 70. Mixer 69 is also fed the "ÿ" signal from lead 65 receiving the output of modulator 57. In the operation of this portion of the combination, mixer 69 constitutes a means for providing an output in accordance with the difference between the signal "ÿ" and the signal $\phi$ of the roll pick-off 14. An input to mixer 69 from either signal source described that is not balanced is indicative of an error in the reference defined by the gyro. This error signal appears in lead 66 and is fed the input mixer 58 of the integrator and the integrator output mixer 63. The torque exerting erecting device or motor 27 of the combination is consequently operated in accordance with the output of the difference means or mixer 69 and the output of the integrator from generator 61. The input to the integrator is also obtained from the difference means or mixer 69.

Where the gyro instrument is utilized as the vertical reference component of an automatic pilot as represented in Fig. 4, the torque erecting device or motor 27 of the combination is operated by the output "ÿ" of the provided acceleration signal deriving means and the output from the integrator obtained from generator 62. These signals are combined in mixer 63 and fed the motor 27 by way of lead 68, amplifier 32 and lead 33 to energize the control field winding of the motor 27 in the proper sense to obtain the required monitoring result. In this form of the invention, the erecting signal is determined by acceleration of the craft in a lateral direction in relation to the radio guidance beam 41. The signal of the radio receiver 42 is differentiated twice to obtain a measure of flight path curvature. If the craft is flying straight, the signal from the radio receiver 42 will show a constant rate of change and the output of the rate network 53 will be zero. If, on the other hand, the craft is turning due to drift in the gyro reference instrument, the rate network 53 will provide a control signal which after modulation in modulator 57 is of proper amplitude and sense to energize motor 27 to cause the rotor case 10 to precess about its axis 12 to return the reference to the vertical. The signal from the integrator in this arrangement corrects for unbalances in the gyro instrument which would otherwise cause a static error in the vertical.

In the combination shown in Fig. 4, the roll pick-off 14 provides an automatic pilot control signal in accordance with tilt of the craft about its roll axis from the reference defined by the gyro instrument. As shown, the output lead 16 of pick-off 14 provides an operating signal for the aileron servo system 71 of the automatic pilot which in turn is drivably connected to the ailerons 72 or other controls for determining the attitude of the craft about its longitudinal or fore and aft axis. The signal from pick-off 14 is connected to the aileron servo system 71 by way of a mixer 73 whose other input may be obtained from a bank or roll command pick-off 74 by way of lead 75. The pick-off 74 may be of the same character as pick-offs 14 and 18. The turn knob 76 of the automatic pilot is moved by the human pilot from a detent or null position when it is desired to maneuver the craft in a turn or to bank the craft. With pick-off 74 providing a command input to mixer 73 and aileron servo system 71, the ailerons are operated differentially to cause the craft to bank. As the craft banks, the pick-off 14 provides an opposing input to the system by way of mixer 73 that increases in amplitude to balance the command signal and stop the rolling motion of the craft when the same reaches the desired bank angle as determined by the setting of knob 76. Under conditions of a command maneuver of this character, it is necessary to cut-off or disable the erecting control signal "ÿ" for the instrument or otherwise this input would falsely precess the gyro. The means shown to accomplish this result in Fig. 4 is represented by a normally closed switch 77 in the operative connection between the modulator 57 and the motor 27. The output of modulator 57 is the acceleration signal "ÿ" as obtained from the follow-up components operated by the signal of the radio receiver 42 and the rate network 53 which combined provide a means responsive to the signal of the radio receiver providing an output in accordance with the acceleration of the craft in a cross course lateral direction. The means for opening the switch 77 with operation of the roll or bank command pick-off 74 is a positive mechanical connection between the shaft of the knob 76 and the blade of switch 77. Consequently, during command maneuvers of the craft effected through operation of the turn knob 76, the erecting control for torquing of the gyro instrument about axis 17 is cut-off or disabled.

Figure 2:
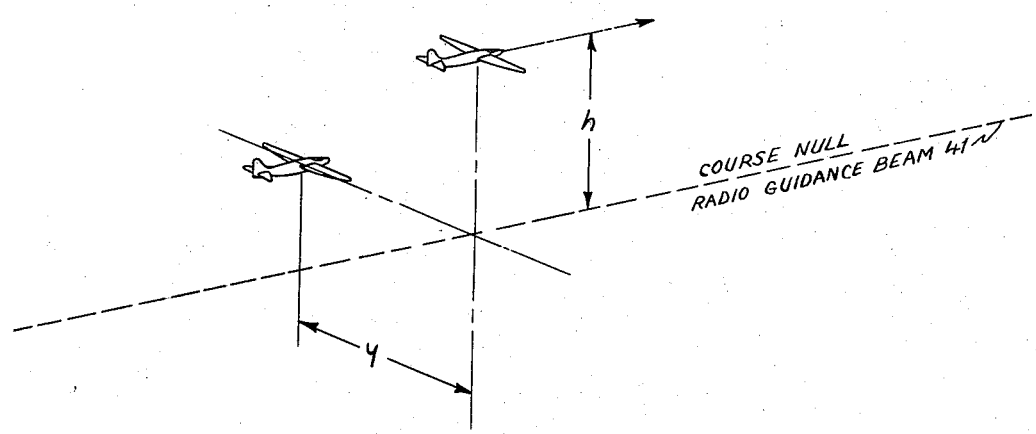
Fig. 2 is a view similar to Fig. 1, in which displacement of the craft both laterally and vertically from a radio guidance beam is depicted, both displacements being factors considered in explanation of the improved gyro vertical instrument.

In the form of the invention shown in Fig. 4, the gyro vertical is monitored in relation to its athwartship or pitch axis 17 by a signal proportional to or in accordance with the velocity of the craft in a cross course vertical direction effective through the erecting device or torquing motor 28. The primary long term reference or monitoring control in this arrangement may consist of a radio receiver 78 such as the glide path receiver as used in an instrument landing system. Receiver 78 is located on the craft and, as represented in Fig. 2, provides an output signal "h" proportional to the vertical displacement of the craft from the course null or radio guidance beam 41. To obtain the required velocity signal, the output of radio receiver 78 is applied to a modulator 79 and a follow-up arrangement similar in character to the arrangement utilized to obtain the heretofore described rate of change signal "ẏ." The components of the present arrangement include a mixer 80 whose primary input is the direct current output of modulator 79, an amplifier 81 receiving the output of the mixer 80, a motor-generator set whose motor 82 is driven by the output of the amplifier 81 and whose generator 83 supplies the required output signal "ḣ" by way of lead 84. Generator 83 also provides a negative feedback signal for the arrangement whose input is fed mixer 80 by way of lead 85. A further feedback control for the arrangement is provided by a generator 86 whose rotor is driven by motor 82 through suitable reduction gearing. The output of generator 86 is supplied to the mixer 80 by way of lead 87. The motor 82 in this arrangement rotates at a speed proportional to the rate of change of the signal "$h$" from the radio receiver 78. The electrical output of the generator 83 of the arrangement thusly provides a measure of the required factor "$\dot{h}$."

Alternative means for obtaining a control signal "$\dot{h}$" for the improved gyro vertical may include an altitude reference for the craft. As shown in Fig. 4, this means may take the form of the altitude control for automatic pilots shown and described in U. S. patent application S. N. 210,152, filed February 9, 1951 by Harry Miller and Robert D. Love. This control includes an aneroid element 88 sensitive to the static pressure conditions of the aircraft at its flight altitude. Variations in atmospheric pressure such as caused by changes in the altitude of the craft are sensed by the aneroid element 88. This motion is transmitted by way of actuating rod 89 to move the armature of a suitable E-type pick-off 90 whose output is fed the mixer 91. The cam and strap arrangement 92 apply a variable counter torque to the rod 89 so as to balance the force on the rod exerted by the aneroid element 88. A condition where the armature of the pick-off 90 is displaced relative to the wound stator reflects unbalance in the torque forces affecting the rod 89. In the arrangement, the output of pick-off 90 after passing through mixer 91 and amplification in amplifier 93 is utilized to drive a further motor-generator set whose motor 94 is connected to amplifier 93 by lead 95. The generator 96 provides the required output "$\dot{h}$" which is included in the control arrangement by means of lead 97. Lead 98 to lead 97 connects the generator 96 to mixer 91 to provide a follow-back control for the motor 94. The mechanical output of the motor 94 is effective through suitable reduction gearing to increase or decrease the torque exerted by the cam strap arrangement on the rod 89. The motor is thus operative to restore the balance in the torque forces affecting the rod 89 and thusly to recenter the armature of the pick-off 90. In the described arrangement, the motor 94 rotates at a speed proportional to the rate of climb or descent of the craft from a reference altitude. The output of the generator 96 consequently is a signal "$\dot{h}$" proportional to the velocity of the craft in a cross course vertical direction. The described arrangements provide a means responsive to radio receiver 78 or aneroid device 88 that provides an output in accordance with the velocity of the craft in a cross course vertical direction.

As shown, selective switch 99 is provided so that the controlling input to torque motor 28 may be obtained alternatively from either the generator 83 responsive to the output of the radio receiver 78 or the generator 96 responsive to the influence of the aneroid device 88. In the closed position of the switch 99 shown in Fig. 4, the control signal is obtained from generator 83.

From switch 99, the signal "$\dot{h}$" is fed the torque motor 28 by way of mixer 100, lead 101, mixer 102, lead 103, lead 36, amplifier 37 and lead 38. The integrator utilized in the roll axis gyro vertical control is also utilized for the same reason in the control of the torque motor 28 monitoring the instrument in relation to its pitch axis 17. The components forming the instant integrator include mixer 104 that receives the signal "$\dot{h}$" from mixer 101 by way of lead 105, amplifier 106, a motor-generator set consisting of motor 107, driven by the output of the amplifier 106 and generator 108, driven by the motor 107 whose output is supplied to mixer 104 as a feedback control, and a further signal generator 109 whose rotor feeds the output of the integrator to mixer 102 by way of lead 110. Mixer 102 accordingly combines the output of the integrator and the control signal "$\dot{h}$" to provide a unitary output for operating the torque motor or erecting device 28.

In the combination shown in Fig. 4, the pick-off 18 provides an automatic pilot signal in accordance with tilt of the craft about its pitch axis from the reference defined by the gyro instrument. Pick-off 18 is operatively connected to the elevator servo system 111 of the automatic pilot by way of lead 19 and mixer 112. The elevator servo system 111 is mechanically coupled to the elevators 113 of the craft to control the attitude of the same with respect to its pitch axis. The automatic pilot shown also includes a pitch command pick-off 114 which may be a signal generator similar to pick-offs 14 and 16 whose rotor is adjustable by the human pilot through knob 115 to cause the craft to climb or descend. In this connection, the output of the pick-off 114 is effective in this respect by operation of the elevators 113 through the elevator servo system 111 energized by the signal of pick-off 114 fed to the system by way of lead 116 and mixer 112 to which the lead 116 is connected. Mixer 112 accordingly combines the pitch attitude signal from pick-off 18 and command signal from pick-off 114, the craft moving about its pitch axis by reason of the command signal until it is balanced by the signal of pick-off 18. The elevators then reassume a streamline condition and the attitude of the craft remains accordingly inclined with respect to the gyro reference instrument until the knob 115 of the pick-off 114 is centered and the output thereof is null. As shown, lead 117 from the pitch command pick-off 114 connects the same with mixer 100 in the control circuit to the torque motor 28.

In maneuvers of the craft through the automatic pilot effected by operation of the pick-off 114, the mixer 100 serves the purpose of a comparing unit for the command signal and the control signal "$\dot{h}$," any difference between the signals being fed to the integrator and to the mixer 102 by way of lead 101 for use in operating the torque motor 28. In command climb or dive maneuvers of the craft, unless the gyro vertical is in error in its defined vertical, the signal inputs to the mixer 100 should be equal and opposite. Accordingly, in the combination provided, it is not necessary to disable the normal controlling input to torque motor 28 under the conditions described. For the described control axis, the torque exerting device 28 is operatively connected to both the pitch command pick-off 114 and the means for providing the velocity signal "$\dot{h}$" which consists of either generator 83 or generator 96. With output of the command pick-off 114 null, the gyro vertical is monitored in relation to pitch axis 17 by torque motor 28 from the controlling inputs obtained from the sensing of the receiver 78 or aneroid device 88. Where the craft moves from its pitch reference position due to drift in the gyro reference instrument, the receiver 78 or aneroid device 88 is effective to provide the necessary input to the torque motor to cause the rotor case 10 to precess about its axis 17 to return the reference to the vertical. As in the instance heretofore described, the integrator in the arrangement corrects for an unbalanced condition in the gyro instrument which would otherwise cause a static error in the determined vertical.

In accordance with the artificial horizon form of the invention shown in Figs. 1 and 3, the gyro vertical is erected in relation to its pitch axis 12 by the torque exerting device or motor 28. The long term reference, in this instance, is provided by three devices that together provide a measure of the pitch angle $\theta$ of the craft as represented in Fig. 1. As shown, a suitable angle of attack sensor 118 in the form of a conventional vane operated pick-off on the craft provides an output that measures the craft angle of attack with respect to a reference line in the fuselage. This angle is represented in Fig. 1 by $\alpha$. Sensor 118 defines a means for providing a signal in accordance with the angle of attack of the craft. The sensor 118 provides one of the reference devices for monitoring the torque motor 28. Where the craft employing the monitored gyro vertical is an aircraft with flap surfaces such as indicated at 119, it is necessary to modify the input signal to the torque motor 28 from the sensor 118 in accordance with any adjustment of the flap surfaces. This may be accomplished by means of a flap position pick-off 120 whose rotor is suitably connected to the flap surface 119. The output of pick-off 120 to mixer 121 receiving the signal of sensor 118 effects the required modification. The output lead 122 from mixer 121 carries a signal proportional to the angle of attack α shown in Fig. 1.

The angle γ or flight path angle of the craft is obtained by computing the ratio between the craft's vertical speed and forward speed. The vertical speed may be measured by means of a further aneroid controlled arrangement of the type hereinbefore described in the description of Fig. 3 which in this instance includes aneroid bellows 123, rod 124, pick-off 125, mixer 126, amplifier 127, motor 128, generator 129, cam and strap connection 130, and lead 131 connecting the amplifier 127 and motor 128. The signal from generator 129 carried by lead 132 provides a measure of the vertical velocity "ḣ" of the craft. As shown, the vertical velocity signal "ḣ" is applied to a potentiometer 133 whose wiper 134 is positioned in accordance with the reciprocal of true airspeed of the craft. This third reference value is obtained from a suitable true airspeed meter 135 whose output is mechanically coupled to the slider 134 by way of a reciprocal computer 136. In the arrangement provided, cam 137 is positioned in accordance with the voltage signal between the wiper 134 and the grounded end of potentiometer 133 by a follow-up system consisting of amplifier 138, motor 139, generator 140 and synchro or pick-off generator 141 whose rotor is driven by the motor 139 through suitable reduction gearing. Generator 140 provides a feedback input to the amplifier 138. The primary controlling input to the amplifier 138 is obtained from the slider 134 through the rotor of synchro 141. The voltage or signal input to the system and consequently the position output of the cam 137 are proportional to the ratio between vertical and true forward airspeeds of the craft. The cam follower 142 for cam 137 accordingly assumes an angular position, the cosine of which is proportional to the position of cam 137. The angle thus represented is the computed flight path angle γ of the craft as indicated in Fig. 3 by the position of shaft 143. An electrical signal representing the flight path angle γ is obtained by positioning the wiper 144 of a potentiometer 145 by the shaft 143. As shown, the potentiometer is energized from source 15 and is center-tapped to ground. The signal thus developed is fed by way of lead 146 to mixer 147 where it is additively combined with the signal α to provide a computed measure of the pitch angle θ of the craft. Mixer 147 provides a means for additively combining the signals of the angle of attack sensor and the flight path angle signal means.

In the described arrangement, lead 148 carries an output θ to a mixer 149 where it is compared with the signal of the pitch synchro or pick-off 18 which is fed the mixer by way of lead 150. When the computed pitch angle and the signal of the pick-off are the same, mixer 149 has a null output and the input to the erecting torque motor 28 is also null. When the compared signals are different, mixer 149 detects the difference and provides an output that represents the error in the gyro vertical with respect to its pitch axis 17. This output is utilized to correct the gyro vertical through operation of monitoring torque motor 28. Mixer 149 constitutes a means providing an output in accordance with the difference between the computed pitch angle θ and the pitch angle as represented by the signal of the pitch synchro 18 at the gyroscopic vertical reference.

As in the previously described forms of the invention, the torque motor 28 is also controlled by the output of an integrator which is likewise fed the output of the mixer 149. The integrator, in the present instance, includes mixer 151, amplifier 152, motor-generator set with motor 153 driving the generator 154 and the rotor of a synchro or pick-off 155 through suitable reduction gearing. The generator 154 of the arrangement feeds a feedback signal to the mixer 151. The output obtained from a pick-off 155 is supplied the mixer 156 by way of lead 157. Lead 158 connects mixer 156 with the primary controlling output from mixer 149. The combined signals at mixer 156 are fed as a controlling input to motor 28 by way of lead 159, amplifier 160 and lead 161. The integrator element of the control corrects the instrument for mass unbalance therein which would otherwise result in a static error in the vertical reference that it defines.

In the form of the invention shown in Fig. 3, the gyro vertical may be either a direct or remote reading type. As specifically depicted therein, the signals of the roll and pitch synchros 14 and 18 respectively are utilized to operate a remote horizon indicator 162 through a repeater amplifier 163 in a conventional manner.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. The combination in a dirigible craft of, a gyro vertical having an erecting device for exerting a torque about its pitch axis, a radio receiver on the craft providing a signal proportional to the lateral displacement of the craft from a radio guidance beam, means responsive to the signal of said radio receiver providing an output in accordance with the acceleration of the craft in a cross course lateral direction, and means operatively connecting said acceleration output means and said torque exerting erecting device.

2. The combination in a dirigible craft of, a gyro vertical having an erecting device for exerting a torque about its pitch axis, a radio receiver on the craft providing a signal proportional to the lateral displacement of the craft from a radio guidance beam, means responsive to the signal of said radio receiver providing an output in accordance with the acceleration of the craft in a cross course lateral direction, an integrator receiving an input from said acceleration output means providing an output, and means for operating said torque exerting erecting device in accordance with the outputs of said acceleration means and said integrator.

3. The combination in a dirigible craft of, a gyro vertical having an erecting device for exerting a torque about its pitch axis and a pick-off providing a signal in accordance with tilt of the craft about its roll axis from the reference defined by the gyro, a radio receiver on the craft providing a signal proportional to the lateral displacement of the craft from a radio guidance beam, means responsive to the signal of said radio receiver providing an output in accordance with the acceleration of the craft in a cross course lateral direction, means providing an output in accordance with the difference between the output of said acceleration output means and the signal of said roll pick-off, and means for operating said torque exerting erecting device in accordance with the output of said difference means.

4. The combination in a dirigible craft of, a gyro vertical having an erecting device for exerting a torque about its pitch axis and a pick-off providing a signal in accordance with tilt of the craft about its roll axis from the reference defined by the gyro, a radio receiver on the craft providing a signal proportional to the lateral displacement of the craft from a radio guidance beam, means responsive to the signal of said radio receiver providing an output in accordance with the acceleration of the craft in a cross course lateral direction, means providing an output in accordance with the difference between the output of said acceleration output means and the signal of said roll pick-off, an integrator receiving an input from said difference means providing an output, and means for operating said torque exerting erecting device in accordance with the outputs of said difference means and said integrator.

5. The combination in a dirigible craft of, an automatic pilot having a gyro vertical with an erecting device for exerting a torque about its pitch axis and a pick-off providing an automatic pilot signal in accordance with tilt of the craft about its roll axis from the reference defined by the gyro, a radio receiver on the craft providing a signal proportional to the lateral displacement of the craft from a radio guidance beam, means responsive to the signal of said radio receiver providing an output in accordance with the acceleration of the craft in a cross course lateral direction, and means operatively connecting said acceleration output means and said torque exerting erecting device.

6. The combination in a dirigible craft of, an automatic pilot having a gyro vertical with an erecting device for exerting a torque about its pitch axis and a pick-off providing an automatic pilot signal in accordance with tilt of the craft about its roll axis from the reference defined by the gyro, a radio receiver on the craft providing a signal proportional to the lateral displacement of the craft from a radio guidance beam, means responsive to the signal of said radio receiver providing an output in accordance with the acceleration of the craft in a cross course lateral direction, an integrator receiving an input from said acceleration output means providing an output, and means for operating said torque exerting erecting device in accordance with the outputs of said acceleration means and said integrator.

7. The combination in a dirigible craft of; an automatic pilot having a gyro vertical with an erecting device for exerting a torque about its pitch axis, a pick-off providing an automatic pilot signal in accordance with tilt of the craft about its roll axis from the reference defined by the gyro, and a roll command pick-off; a radio receiver on the craft providing a signal proportional to the lateral displacement of the craft from a radio guidance beam, means responsive to the signal of said radio receiver providing an output in accordance with the acceleration of the craft in a cross course lateral direction, means operatively connecting said acceleration output means and said torque exerting erecting device including a normally closed switch, and means for opening said switch with operation of said roll command pick-off.

8. The combination in a dirigible craft of, a gyro vertical having an erecting device for exerting a torque about its roll axis and a pick-off providing a signal in accordance with tilt of the craft about its pitch axis from the reference defined by the gyro, means for providing a signal in accordance with the angle of attack of the craft, means for providing a signal in accordance with the flight path angle of the craft, means for additively combining the signals of said angle of attack signal means and flight path angle signal means, means providing an output in accordance with the difference between the additively combined signals and the signal of said pick-off, and means for operating said torque exerting erecting device in accordance with the output of said difference means.

9. The combination claimed in claim 8 in which said dirigible craft is an aircraft with adjustable flap surfaces, including signal means operatively connected to said flap surfaces for modifying the signal of said angle of attack signal means in accordance with the adjustment of the flap surfaces.

10. The combination in a dirigible craft of, a gyro vertical having an erecting device for exerting a torque about its roll axis and a pick-off providing a signal in accordance with tilt of the craft about its pitch axis from the reference defined by the gyro, means for providing a signal in accordance with the angle of attack of the craft, means for providing a signal in accordance with the flight path angle of the craft, means for additively combining the signals of said angle of attack signal means and flight path angle signal means, means providing an output in accordance with the difference between the additively combined signals and the signal of said pick-off, an integrator receiving an input from said difference output means providing an output, and means for operating said torque exerting erecting device in accordance with the outputs of said difference means and said integrator.

11. The combination in a dirigible craft of, an automatic pilot having a gyro vertical with an erecting device for exerting a torque about its roll axis and a pick-off providing an automatic pilot signal in accordance with tilt of the craft about its pitch axis from the reference defined by the gyro, means on the craft providing a signal in accordance with its velocity in a cross course vertical direction, and means operatively connecting said velocity signal means and said torque exerting erecting device.

12. The combination in a dirigible craft of, an automatic pilot having a gyro vertical with an erecting device for exerting a torque about its roll axis and a pick-off providing an automatic pilot signal in accordance with tilt of the craft about its pitch axis from the reference defined by the gyro, means on the craft providing a signal in accordance with its velocity in a cross course vertical direction, an integrator receiving an input from said velocity signal means providing an output, and means for operating said torque exerting erecting device in accordance with the signal of said velocity signal means and the output of said integrator.

13. The combination in a dirigible craft of, an automatic pilot having a gyro vertical with an erecting device for exerting a torque about its roll axis and a pick-off providing an automatic pilot signal in accordance with tilt of the craft about its pitch axis from the reference defined by the gyro, a radio receiver on the craft providing a signal proportional to the vertical displacement of the craft from a radio guidance beam, means responsive to the signal of said radio receiver providing an output in accordance with the velocity of the craft in a cross course vertical direction, and means operatively connecting said velocity output means and said torque exerting erecting device.

14. The combination in a dirigible craft of, an automatic pilot having a gyro vertical with an erecting device for exerting a torque about its roll axis and a pick-off providing an automatic pilot signal in accordance with tilt of the craft about its pitch axis from the reference defined by the gyro, an aneroid device providing an altitude reference for the craft, means responsive to said aneroid device providing an output in accordance with the velocity of the craft in a cross course vertical direction, and means operatively connecting said velocity output means and said torque exerting erecting device.

15. The combination in a dirigible craft of, an automatic pilot having a gyro vertical with an erecting device for exerting a torque about its roll axis, a pick-off providing an automatic pilot signal in accordance with tilt of the craft about its pitch axis from the reference defined by the gyro, and a pitch command pick-off; means on the craft providing a signal in accordance with its velocity in a cross course vertical direction, and means operatively connecting said velocity signal means, said pitch command pick-off and said torque exerting erecting device.

16. The combination in a dirigible craft of; a gyro vertical having an erecting device for exerting a torque about its roll axis, an erecting device for exerting a torque about its pitch axis, a pick-off providing a signal in accordance with tilt of the craft about its pitch axis from the reference defined by the gyro, and a pick-off providing a signal in accordance with tilt of the craft about its roll axis from the reference defined by the gyro; a radio receiver on the craft providing a signal proportional to the lateral displacement of the craft from a radio guidance beam, means responsive to the signal of said radio receiver providing an output in accordance with acceleration of the craft in a cross course lateral direction, means providing an output in accordance with the difference between the output of said acceleration output means and the signal of said roll pick-off, means for operating said pitch axis torque exerting erecting device in accordance with the output of said difference means, means for providing a signal in accordance with the angle of attack of the craft, means for providing a signal in accordance with the flight path angle of the craft, means for additively combining the signals of said angle of attack signal means and flight path angle signal means, second means providing an output in accordance with the difference between the additively combined signals and the signal of said pitch pick-off, and means for operating said roll axis torque exerting erecting device in accordance with the output of said second difference means.

17. In an automatically piloted dirigible craft, an automatic pilot having a gyro vertical providing a vertical reference for the craft, means on the craft providing a signal in accordance with its velocity in a cross course vertical direction, means on the craft providing a signal in accordance with its acceleration in a cross course lateral direction, and means for erecting said gyro vertical operatively connected to said velocity and acceleration signal means.

18. In an automatically piloted dirigible craft, an automatic pilot having a gyro vertical with an axis fore and aft of the craft and an axis athwartship of the craft, means for erecting the gyro vertical about its athwartship axis in accordance with the velocity of the craft in a cross course vertical direction, and means for erecting the gyro vertical about its fore and aft axis in accordance with the acceleration of the craft in a cross course athwartship direction.

19. In an automatically piloted dirigible craft, an automatic pilot having a gyro vertical with a roll axis erecting torque motor and a pitch axis erecting torque motor, means for operating said roll axis torque motor by a signal proportional to the velocity of the craft in a cross course vertical direction, and means for operating said pitch axis torque motor by a signal proportional to the acceleration of the craft in a cross course lateral direction.

20. In an automatically piloted dirigible craft, an automatic pilot having a gyro vertical with a roll axis erecting torque motor and a pitch axis erecting torque motor, means on the craft providing a signal in accordance with its velocity in a cross course vertical direction, an integrator receiving an input from said velocity signal means providing an output, means for operating said roll axis torque motor in accordance with the signal of said velocity signal means and the output of said velocity signal integrator, means on the craft providing a signal in accordance with its acceleration in a cross course lateral direction, an integrator receiving an input from said acceleration signal means, and means for operating said pitch axis torque motor in accordance with the signal of said acceleration signal means and the output of said acceleration signal integrator.

21. The combination in a dirigible craft of, an automatic pilot having a gyro vertical with an erecting device for exerting a torque about its roll axis and a pick-off providing an automatic pilot signal in accordance with tilt of the craft about its pitch axis from the reference defined by the gyro, an altitude reference for the craft, means responsive to said altitude reference providing an output in accordance with the velocity of the craft in a cross course vertical direction, and means operatively connecting said velocity output means and said torque exerting device.

22. The combination in a dirigible craft of, an automatic pilot having a gyro vertical with an erecting device for exerting a torque about its roll axis, a pick-off providing an automatic pilot signal in accordance with tilt of the craft about its pitch axis from the reference defined by the gyro, and a pitch command pick-off; means on the craft providing a signal in accordance with its velocity in a cross course vertical direction, and means for operating said torque exerting erecting device in accordance with the difference between the signal of said cross course velocity signal means and the output of said pitch command pick-off.

References Cited in the file of this patent
UNITED STATES PATENTS

| | | |
|---|---|---|
| 2,423,336 | Moseley | July 1, 1947 |
| 2,734,703 | Markusen | Feb. 14, 1956 |